UNITED STATES PATENT OFFICE.

HENRY COLGATE, OF JERSEY CITY, NEW JERSEY.

IMPROVEMENT IN STARCH-MAKING.

Specification forming part of Letters Patent No. 13,340, dated July 24, 1855.

*To all whom it may concern:*

Be it known that I, HENRY COLGATE, of Jersey City, in the county of Hudson and State of New Jersey, have invented or discovered a new and Improved Mode of Manufacturing Starch; and I do hereby declare that the following is a full and exact description thereof, reference being had to the accompanying ingredients and the specimen of the resulting combination by my mode.

The nature of my invention or discovery consists in combining the starch at a certain stage of its manufacture with relative proportions of sugar, so as to produce a composition capable, first, of imparting a shining or glossy appearance to linen, or any material to which it may be applied, and ironed or pressed into by the ordinary methods of ironing; second, also capable of being ironed or pressed without causing the irons or pressers to stick or adhere to it and roll up under the irons or pressers, like other kinds of starch; third, also capable, by reason of possessing more substantial body, of imparting and giving to linen or any other material to which starch is ordinarily applied a superior strength and firmness, whereby the linen or other material is better enabled to resist the effects of moisture, perspiration, &c., not falling or flattening down from the effects of it so soon as when stiffened by other kinds of starch; fourth, also capable of answering better for combustible purposes than other starch when cooked into puddings, blanc-mange, custards, &c.

To enable others to use my invention, I hereby describe the process, which is as follows, viz: I dissolve one hundred pounds of refined sugar in sixty gallons of clear cold water and mix it with the starch just after the starch is separated from the gluten in the cisterns, stirring the solution of sugar and the starch well together preparatory to boxing. When they are well stirred together and combined or mixed I immediately put the compound into the boxes and the boxes into the stoves, drying as in the usual way. With every thirty pounds of starch I mix one pound of sugar.

What I claim as my invention or discovery, and desire to secure by Letters Patent, is—

The process of manufacturing starch by adding to it, in the process of making, a certain amount of sugar, in the manner and for the purpose as set forth in the specification.

HENRY COLGATE.

Witnesses:
ROBERT COLBY,
HOWARD A. MARTIN.